United States Patent
Beverly (10) Patent No.: US 8,909,978 B2
(45) Date of Patent: *Dec. 9, 2014

(54) REMOTE ACCESS DIAGNOSTIC MECHANISM FOR COMMUNICATION DEVICES

(71) Applicant: QUALCOMM Incorporated, San Diego, CA (US)

(72) Inventor: Harlan T. Beverly, McDade, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,659

(22) Filed: Aug. 22, 2013

(65) Prior Publication Data

US 2013/0339782 A1    Dec. 19, 2013

Related U.S. Application Data

(63) Continuation of application No. 12/174,278, filed on Jul. 16, 2008, now Pat. No. 8,543,866.

(60) Provisional application No. 60/950,989, filed on Jul. 20, 2007.

(51) Int. Cl.
  *G06F 11/00*  (2006.01)
  *G06F 11/07*  (2006.01)
  *G06F 11/22*  (2006.01)

(52) U.S. Cl.
  CPC ........ *G06F 11/0793* (2013.01); *G06F 11/0748* (2013.01); *G06F 11/2294* (2013.01)
  USPC .......................................................... 714/4.4

(58) Field of Classification Search
  CPC ............ G06F 11/0772; G06F 11/0748; G06F 11/0793; G06F 11/2294
  USPC ................................................ 714/4.4, 25–27
  See application file for complete search history.

(56) References Cited

U.S. PATENT DOCUMENTS 3,838,261 A   9/1974  Rice et al.
4,057,847 A  11/1977  Lowell et al.

(Continued)

FOREIGN PATENT DOCUMENTS

DE    10218795 A1   11/2003
JP    10314451 A    12/1998
JP    2001246147 A   9/2001

OTHER PUBLICATIONS

International Search Report—PCT/US08/70160—ISAEPO—Oct. 6, 2008 4 pages.

(Continued)

*Primary Examiner* — Yair Leibovich
(74) *Attorney, Agent, or Firm* — DeLizio Gilliam, PLLC (57) ABSTRACT

A method for diagnosing and correcting errors at a data processing system is disclosed includes detecting at a first device of the system, such as a network interface device, an error at a second device of the system, such as a data processor. In response to detecting the error, the first device communicates a help request via a network. In response to the help request, the first device receives diagnostic and error correction routines from a remote system. The first device executes the routines and provides information to the remote system to diagnose and correct errors at the second device.

34 Claims, 7 Drawing Sheets

(56) References Cited

U.S. PATENT DOCUMENTS

| | | | |
|---|---|---|---|
| 5,353,412 A | 10/1994 | Douglas et al. | |
| 5,355,371 A | 10/1994 | Auerbach et al. | |
| 5,446,741 A | 8/1995 | Boldt et al. | |
| 5,675,736 A | 10/1997 | Brady et al. | |
| 5,771,287 A | 6/1998 | Gilley et al. | |
| 5,890,963 A | 4/1999 | Yen | |
| 5,974,567 A | 10/1999 | Dickson, Jr. et al. | |
| 6,015,348 A | 1/2000 | Lambright et al. | |
| 6,189,117 B1 | 2/2001 | Batchelor et al. | |
| 6,240,517 B1 | 5/2001 | Nishioka | |
| 6,480,972 B1 | 11/2002 | Cromer et al. | |
| 6,601,183 B1 | 7/2003 | Larson et al. | |
| 6,615,218 B2 | 9/2003 | Mandal et al. | |
| 6,625,661 B1 | 9/2003 | Baldwin, Jr. | |
| 6,691,303 B2 | 2/2004 | Guthrie et al. | |
| 6,745,236 B1 | 6/2004 | Hawkins et al. | |
| 6,763,371 B1 | 7/2004 | Jaendel | |
| 6,810,528 B1 | 10/2004 | Chatani | |
| 6,908,389 B1 | 6/2005 | Puskala | |
| 6,918,042 B1 | 7/2005 | Debry | |
| 6,941,353 B1 | 9/2005 | Lane | |
| 6,961,852 B2 | 11/2005 | Craft | |
| 6,988,196 B2 | 1/2006 | Cromer et al. | |
| 7,000,115 B2 | 2/2006 | Lewis et al. | |
| 7,003,548 B1 | 2/2006 | Barck et al. | |
| 7,046,680 B1 | 5/2006 | McDysan et al. | |
| 7,065,756 B2 | 6/2006 | Barsness et al. | |
| 7,139,780 B2 | 11/2006 | Lee et al. | |
| 7,209,449 B2 | 4/2007 | Tang et al. | |
| 7,249,109 B1 | 7/2007 | Silverbrook et al. | |
| 7,266,515 B2 | 9/2007 | Costello et al. | |
| 7,274,702 B2 | 9/2007 | Toutant et al. | |
| 8,543,866 B2 * | 9/2013 | Beverly | 714/38.14 |
| 2001/0054161 A1 | 12/2001 | Wooddruff et al. | |
| 2002/0078223 A1 | 6/2002 | Baldonado et al. | |
| 2002/0180583 A1 | 12/2002 | Paatero et al. | |
| 2002/0198932 A1 | 12/2002 | Wagner | |
| 2003/0177187 A1 | 9/2003 | Levine et al. | |
| 2003/0191857 A1 | 10/2003 | Terrell et al. | |
| 2004/0003317 A1 | 1/2004 | Kwatra et al. | |
| 2004/0068580 A1 | 4/2004 | Jo et al. | |
| 2004/0073654 A1 * | 4/2004 | Sarma | 709/224 |
| 2004/0153823 A1 * | 8/2004 | Ansari | 714/38 |
| 2004/0230801 A1 | 11/2004 | Sueyoshi et al. | |
| 2004/0246905 A1 | 12/2004 | Dunagan et al. | |
| 2005/0107161 A1 | 5/2005 | Fujimoto et al. | |
| 2005/0171661 A1 | 8/2005 | Abdel-Malek et al. | |
| 2005/0188073 A1 | 8/2005 | Nakamichi et al. | |
| 2005/0210329 A1 | 9/2005 | Goss et al. | |
| 2005/0235007 A1 | 10/2005 | Abali et al. | |
| 2006/0259579 A1 | 11/2006 | Beverly et al. | |
| 2006/0259632 A1 | 11/2006 | Crawford et al. | |
| 2007/0005986 A1 | 1/2007 | Bernard et al. | |
| 2007/0060373 A1 | 3/2007 | Beverly | |
| 2007/0086343 A1 | 4/2007 | Kujawa et al. | |
| 2007/0101408 A1 | 5/2007 | Nakhjiri | |
| 2007/0189517 A1 | 8/2007 | Koseki et al. | |
| 2007/0226498 A1 | 9/2007 | Walmsley et al. | |
| 2007/0297405 A1 | 12/2007 | He | |
| 2007/0298879 A1 | 12/2007 | Kobayashi et al. | |
| 2008/0009337 A1 | 1/2008 | Jackson et al. | |
| 2008/0009352 A1 | 1/2008 | Aoyama et al. | |
| 2008/0010371 A1 | 1/2008 | Yamamoto et al. | |
| 2008/0013551 A1 | 1/2008 | Scholl | |
| 2008/0016236 A1 | 1/2008 | Beverly et al. | |
| 2008/0016386 A1 * | 1/2008 | Dror et al. | 714/4 |
| 2008/0022389 A1 | 1/2008 | Calcev et al. | |
| 2008/0039208 A1 | 2/2008 | Abrink et al. | |
| 2008/0045285 A1 | 2/2008 | Fujito | |
| 2008/0049621 A1 | 2/2008 | McGuire et al. | |
| 2009/0024872 A1 | 1/2009 | Beverly | |

OTHER PUBLICATIONS

"EPO Search Report (PCT/US2008070160)", Jan. 4, 2013, 7 pages.
Written Opinion—PCT/US2008/070160—ISA/EPO—Oct. 6, 2008 4 pages.
"U.S. Appl. No. 12/174,278 Final Office Action", Jul. 23, 2012, 20 pages.
"U.S. Appl. No. 12/174,278 Office Action", Dec. 12, 2011, 17 pages.

* cited by examiner

FIG. 7

REMOTE ACCESS DIAGNOSTIC MECHANISM FOR COMMUNICATION DEVICES

RELATED APPLICATIONS

This application is a Continuation of U.S. patent application Ser. No. 12/174,278 filed on Jul. 16, 2008, which claims the priority benefit of U.S. Provisional Patent Application No. 60/950,989 filed on Jul. 20, 2007.

FIELD OF THE DISCLOSURE

The present disclosure relates to data processing devices and more particularly to the diagnosis and correction of errors at data processing devices.

BACKGROUND

The use of data processing systems, such as computer devices, cell phones, personal data assistants, and the like, continues to increase. Further, the functions for which data processing systems are employed also continue to grow. This has led to a commensurate increase in the complexity of the data processing device. For example, data processing systems can frequently employ multiple processors, as well as specialized hardware such as graphics cards and input/output controllers. However, as the complexity of the data processing device has grown, so too has the difficulty in diagnosing the cause of errors at a particular system. This difficulty is exacerbated when the error is a catastrophic error that renders the data processing device partially inoperable or inaccessible to a system user. Accordingly, an improved method and device for diagnosing and correcting errors at a data processing system would be useful.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF EMBODIMENT(S)

A system and method for diagnosing and correcting errors at a data processing system is disclosed. The method includes detecting at a first device of the system, such as a network interface device, an error at a second device of the system, such as a data processor. In response to detecting the error, the first device communicates a help request via a network. In response to the help request, the first device receives diagnostic and error correction routines from a remote system. The first device executes the routines and provides information to the remote system to diagnose and correct errors at the second device.

Figure 1:
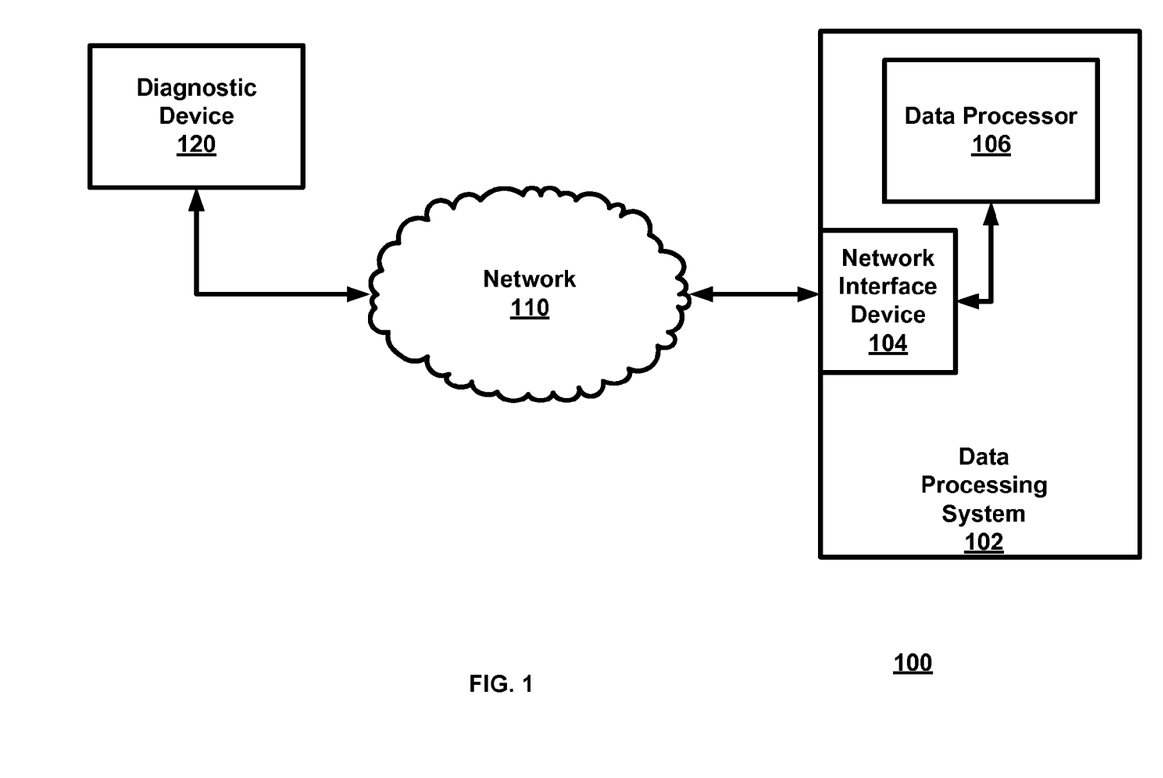
FIG. 1 is a block diagram of a communication system in accordance with one embodiment of the present disclosure.

Referring to FIG. 1, a block diagram of a particular embodiment of a communication system 100 is illustrated. The communication system 100 includes a data processing system 102, a network 110, and a diagnostic device 120. The data processing system 102 and diagnostic device 120 are each connected to the network 110. The network 110 provides a physical communication layer for communications between the diagnostic device 120 and the data processing system 102. For example, the network 110 can be a packet-switched network including one or more routers, servers, and the like, configured to route packets to a destination based on address information associated with each packet. In this configuration, the network 110 can receive packets from each of the diagnostic device 120 and the data processing device 102, and communicate the packets to the other. In a particular embodiment, the network 110 is a wide-area network, such as the Internet. In another embodiment, the network 110 is a local area network. In still another embodiment, the network 110 is a combination of one or more wide area networks and one or more local area networks.

The diagnostic device 120 is a device, such as a server or other data processing system, configured to receive help requests from the network 110 and, in response to a help request, communicate a diagnostic routine to the network 110 for execution at a remote system. Further, the diagnostic device 120 can be configured to receive diagnostic information from the executing diagnostic routine and, based on the diagnostic information, determine an error cause. Based on the error cause, the diagnostic device 120 can communicate an error correction routine configured to address the error cause. In other embodiments, an error correction routine is not communicated, and the error can be remedied in another fashion. For example, the diagnostic device 120 can dispatch replacement equipment or a repair technician to repair the remote device.

In one embodiment, the diagnostic device 120 can be controlled by a user, referred to herein as a service technician. In this embodiment, the diagnostic device is a computer system, such as a server, desktop computer, and the like, configured to display information to the service technician and respond to the technician's instructions. The service technician can monitor help requests received at the diagnostic device 120 and, based on the help request, select a particular diagnostic routine from a set of diagnostic options for communication to the remote device. In addition, the service technician can monitor received diagnostic information and, based on the information, select an error correction routine from a set of error correction options for communication to the remote device. In other embodiments, the diagnostic device 120 can be automated to select the diagnostic and error correction routines without intervention by a user, or to automatically send new equipment or dispatch a repair technician.

The data processing system 102 can be a computer system, such as a laptop computer, desktop computer, server, and the like, a portable electronic device, such as a cell phone, personal data assistant, and the like, or other data processing system. The data processing system 102 includes devices, such as a network interface device 104 and a data processor 106, configured to perform designated tasks for the data processing system 102. For purposes of illustration, the diagnostic and error correction functions of the data processing system 102 will be described with respect to the network interface device 104 and the data processor 106. However, it will be appreciated that the described functions can be performed by other devices at the data processing system 102, such as input/output devices, display devices (e.g. a graphics card), and the like.

In the illustrated embodiment of FIG. 1, the data processor 106 is configured to execute instructions of a computer program in order to perform designated tasks. To execute particular instructions and perform particular tasks, the data processor 106 can interact with other devices of the data processing system 102. For example, the data processor 102 can interact with the network interface device 104 to communicate with remote devices via the network 110.

The network interface device 104 is configured to transmit communications provided by the data processor 106 via the network 110. In particular, the network interface device 104 provides a physical and logical communication interface to the network for communications provided by data processor 106. In addition, the network interface device 104 is configured to provide a physical and logical communication interface to the data processor 106 for communications received from the network 110.

In addition, the network interface device 104 is configured to detect the occurrence of an error at the data processor 106. The detected error can be an error due to a hardware failure or a software error. Further, in one embodiment, the network interface device 104 is configured to detect catastrophic errors. As used herein, a catastrophic error refers to an error that renders a data processing device incapable of executing a diagnostic routine or error correction routine to diagnose or correct the error. Examples of catastrophic errors include memory failures, computer viruses, processor failures, power failures, BIOS failure, BIOS corruption, operating system corruption, application failure, driver failure and the like.

In one embodiment, the network interface device 104 detects an error at the data processor 106 by polling (e.g. sending a message to) the data processor 106 and awaiting a response. If a response is not received in a designated period of time, the network interface device 104 determines an error has occurred. The network interface device 104 can be configured to poll the data processor 106 in response to particular events, such as a power-on or reset event, or configured to poll the data processor 106 periodically. In another embodiment, the data processor 106 can communicate information to the network interface device indicating an error has occurred. In yet another embodiment, the network interface device 104 could detect insufficient system power via a power connection (not shown) to the data processor 106. In still another embodiment, the network interface device 104 could detect a system bus error via a bus error signal from the data processor 106. In still another embodiment, the network interface device 104 could detect a BIOS problem by monitoring the system bus activity for BIOS processing or failure commands or indications. In yet another embodiment, the network interface device 104 could detect an error by monitoring data packets flowing through it for signs of virus or spyware infection or other network traffic indicating a problem state.

In response to detecting an error at the data processor 106, the network interface device 104 automatically sends a help request to the diagnostic device 120 via the network 110. In the illustrated embodiment of FIG. 1, the diagnostic device 120 is located remotely from the data processing system 102, thereby reducing the chance that the diagnostic device 120 will be subject to any conditions that led to the error at the data processor 106. In response to the help request, the diagnostic device 120 communicates a diagnostic routine to the network interface device 104 via the network 110. The network interface device 104 executes the diagnostic routine at the data processing system 102.

In an embodiment, the network interface device 104 is configured to control or interact with one or more devices of the data processing system 102 in order to execute the received diagnostic routine. For example, the network interface device 104 can control a bus of the data processing system 102 in order to interact with system memory other portion of the system. This allows the network interface device 104 more flexibility in determining the cause of the error at the data processor 106.

In an embodiment, the diagnostic routine can determine diagnostic information for the data processing system 102. Examples of diagnostic information can include power or voltage levels, clock frequencies, hardware and software profiles, and the like. For example, the diagnostic information can indicate what software was being executed at the data processor device 106 when the error occurred, what hardware devices of the data processing system are functioning, and the like. The diagnostic information can also indicate the configuration of the data processing system 102, such as the type, model, and version of hardware and software present at the system. In an embodiment, the data processing system 102 can execute a helper application or driver to assist in providing the diagnostic information. The diagnostic routine can query the helper application to determine what applications are running, the operating system being executed, what drivers have been loaded, and the like.

The network interface device 104 can communicate the diagnostic information to the diagnostic device 120 via the network 110. In response to the diagnostic information, the diagnostic device 120 can communicate an error correction routine to the network device 104, which executes the routine at the data processing system 102. For example, based on the diagnostic information the diagnostic device 120 can determine that the error at the data processor 106 is the result of a computer virus, and provide the network interface device with a virus cleaning routine. The network device executes the virus cleaning routine to restore the data processor 106 to a fully operational state.

Accordingly, as illustrated, the network interface device 104 is able to receive and execute diagnostic and error correction routines in response to detecting an error at the data processor 106. This allows errors at the data processing system 102 to be diagnosed and corrected even when a catastrophic error occurs that renders the data processor 106 unable to diagnose or correct the error. The remote diagnosis and correction can reduce the expense of error correction. For example, a service technician can remotely diagnose or correct errors, reducing the need for the technician to make an on-site visit to the data processing device 102.

It will be appreciated that, as indicated above, the error diagnosis and correction functions described above can be performed by other devices of the computer device 102. For example, a graphics card or other hardware device can be configured to perform these functions. In addition, a virtual device, such as a virtual machine interfacing with a hypervisor at the data processing system 102, can be configured to perform these functions.

Figure 2:
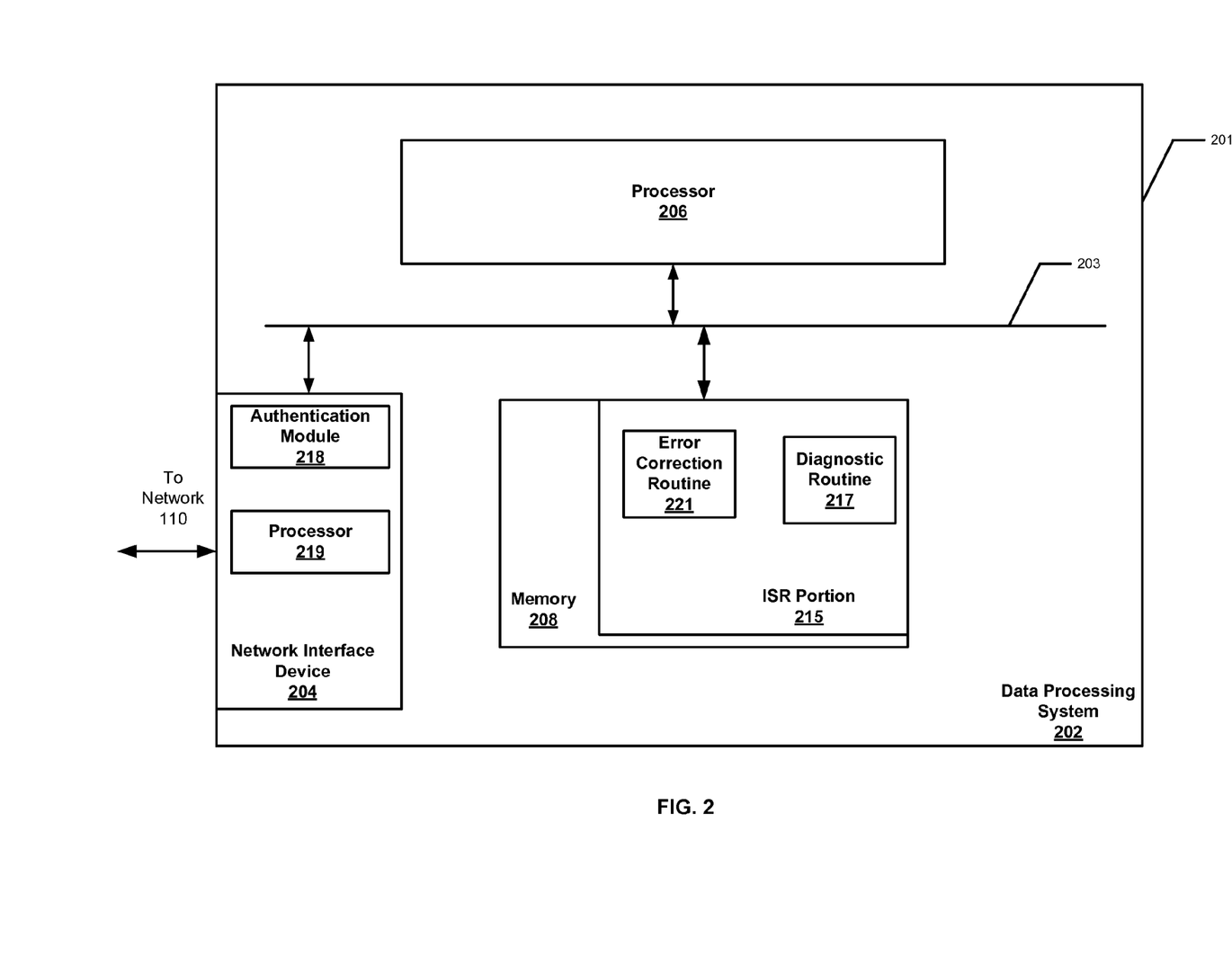
FIG. 2 is a block diagram of a particular embodiment of a data processing system of FIG. 1.

Referring to FIG. 2, a block diagram of a particular embodiment of a data processing system 202, corresponding to the data processing system 102 of FIG. 1, is illustrated. The data processing device 202 includes housing 201, representing a physical enclosure for the illustrated portions of the system. In particular, the housing encloses a processor 206, a network interface device 204, and a memory 208, each of which is connected to a bus 203. The processor 206 and network interface device are configured similarly to the corresponding items of FIG. 1. The memory 208 is a computer readable medium such as volatile memory (e.g. random access memory), non-volatile memory (e.g. read only memory or flash memory), or a combination thereof.

In the illustrated embodiment of FIG. 2, the memory 208 includes an interrupt service routine (ISR) portion 215. The ISR portion 215 is a portion of memory designated for interrupt service routines of the processor 206. In particular, in response to an interrupt communicated via the bus 203 or via a designated input pin (not shown), the processor 206 accesses the ISR portion 215 and executes instructions stored there. In an embodiment, the processor 206 can select a segment of the ISR portion 215 based on the type of interrupt, in order to execute a particular ISR associated with the interrupt.

The network interface device includes an authentication module 218 and a processor 219. The processor 219 is configured to, during normal operation of the processor 206, execute designated network interface functions, including communicating information transmitted from the processor 206 via the network 110, and providing communications from the network 110 to the processor 206. In addition, the processor 206 is configured to detect an error at the processor 206 and, in response to detecting the error, automatically communicate a help request to the diagnostic device 120.

The authentication module 218 is configured to authenticate security information received via the network 110. The authentication module 218 can be a hardware module designed to perform the authentication function, or can be software executed by the processor 219. In response to the authentication module authenticating received security information, the network interface device 204 takes control of the bus 203, the memory 208, and other devices (not shown) of the data processing system 202 in order to execute diagnostic and error correction routines. In an embodiment, the authentication module 218 is configured to be activated in response to the processor 219 determining an error has occurred at the processor 206. In a deactivated state (i.e. before an error at the processor 206 has been detected), the authentication module 218 will not authenticate received security information. This ensures that the network interface device 204 will not accept or authenticate security information in the absence of a detected error, reducing the chance that the diagnostic and error correction functions of the network interface device 204 can be hijacked or otherwise employed for undesired purposes.

In operation, the processor 219 can detect an error at the processor 206. In response, the processor 219 can be configured to automatically communicate a help request to the diagnostic device 120. In response to the help request, the diagnostic device 120 communicates security information (e.g. a password, security key, certificate for trusted private-public key authentication such as Secure Sockets Layer authentication, and the like) to the authentication module 218 via the network 110. The authentication module 218 authenticates the security information and, if the security information indicates the diagnostic device 120 is authorized, indicates the authorization to the processor 219. In response to receiving the authorization information, the processor 219 can be configured to take control of the bus 203 and the optionally take control of the memory 208. The processor 219 can also execute a set of pre-defined diagnostic routines in order to prepare for execution of more complex diagnostic routines provided by the diagnostic device 120. For example, the processor 219 can perform a test of the memory 208 to ensure that it is functioning properly and can accept received diagnostic routines for storage. The processor 219 can notify the diagnostic device 120 of the results of the pre-defined diagnostic routines, so that the device 120 can take appropriate action.

The diagnostic device 120 communicates a diagnostic routine 217 to the network interface device 204. In response, the processor 219 stores the diagnostic routine 217 in the ISR portion 215 of the memory 208. In one embodiment, prior to storing the diagnostic routine 217, the processor 219 instructs the processor 206 to be placed into a loop or other state whereby the processor 206 does not write to the memory 208. This ensures that the diagnostic routine 217 can be safely written to the ISR portion 215 without the processor 206 writing to the same location, overwriting the diagnostic routine, or otherwise having the processor 206 enter an undesired state. After storing the diagnostic routine 217 to the ISR portion 215, the processor 219 sends an interrupt notification to the processor 206. In response the processor 206 automatically executes the instructions at the ISR portion 215. Thus, the processor 206 automatically executes the diagnostic routine 217. Accordingly, in the illustrated embodiment, the interrupt functions of the processor 206 are used by the network interface device 204 in order to allow the processor 206 to execute a diagnostic routine.

Execution of the diagnostic routine 217 can result in diagnostic information being provided by the processor 206 or other devices of the data processing system 202. The diagnostic information is communicated to the processor 219, which in turn communicates the information to the diagnostic device 120 via the network 110. In response to the diagnostic information, the diagnostic device 120 can communicate an error correction routine 221 to the network interface device 204. The processor 219 can store and execute the error correction routine 221 in similar fashion to that described with respect to the diagnostic routine 217. In particular, the error correction routine 221 can be stored at the ISR portion 215 and executed by providing an interrupt request to the processor 206.

Figure 3:
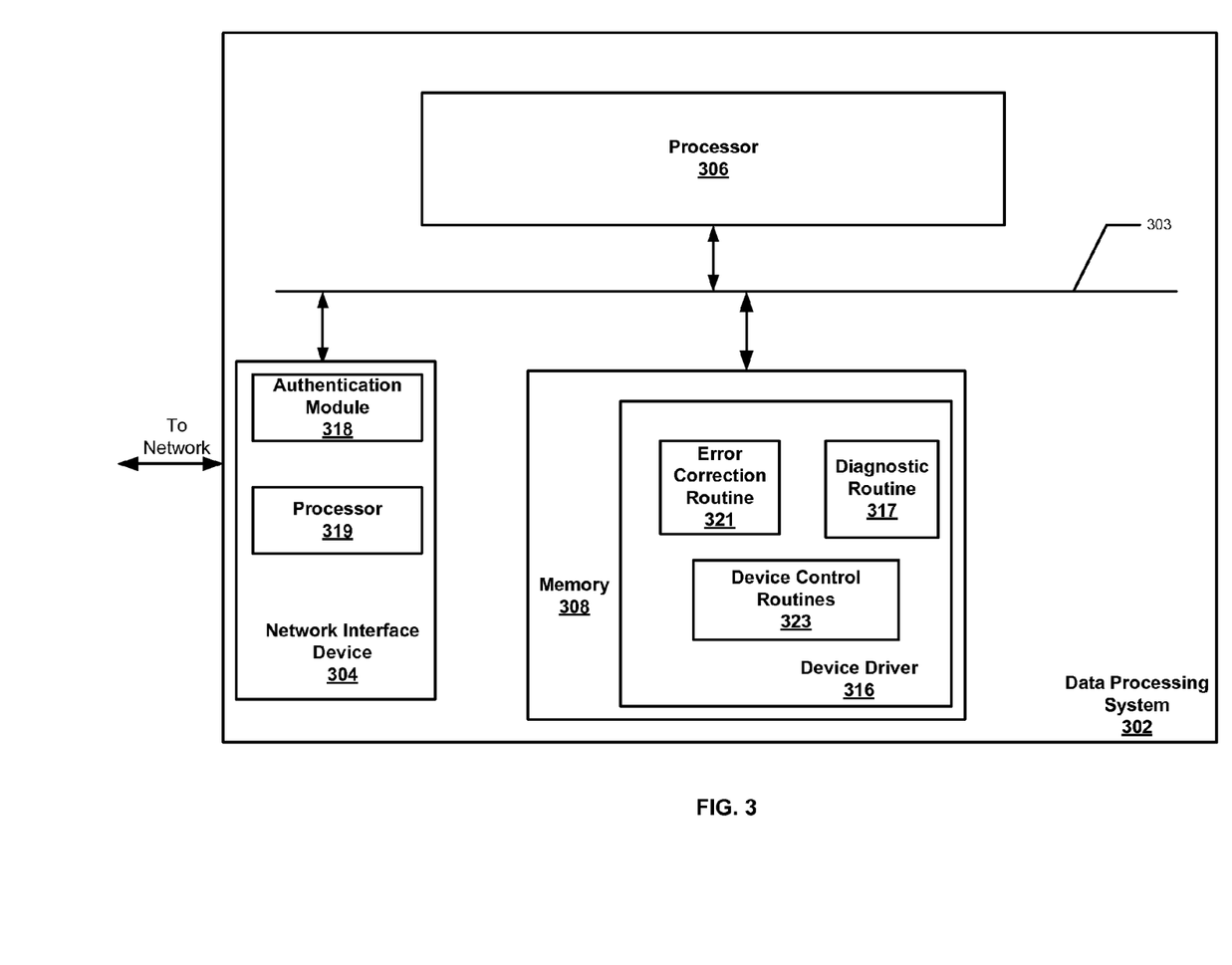
FIG. 3 is a block diagram of an alternative embodiment of a data processing system of FIG. 1.

Referring to FIG. 3, a block diagram of a particular embodiment of a data processing system 302, corresponding to the data processing system 102 of FIG. 1, is illustrated. The data processing system 302 includes a processor 306, a network interface device 304, and a memory 308, each of which is connected to a bus 303. The processor 206, network interface device 304, and memory 308 are configured similarly to the corresponding items of FIG. 2. For example, the network interface device 304 includes an authentication module 318 and a processor 319, each configured similarly to the corresponding items of FIG. 2.

In the illustrated embodiment of FIG. 3, the memory 308 stores a device driver 316. The device driver 316 includes device control routines 323, which are a set of routines configured to control the network interface device 304. During normal operation of the processor 306, the processor executes the device driver 316 and in particular executes the device control routines 323 in order to configure and interact with the network interface device 304. In response to detecting an error, the network interface device 304 sends a help request and receives security information in similar fashion to that described above with respect to FIG. 2. In response to authenticating the security information, the network interface device 304 communicates with the device driver 316 to invoke execution of the diagnostic routine 317. As illustrated, the diagnostic routine 317 is a portion of the device driver 316. In one embodiment, the diagnostic routine 317 is a pre-defined routine of the device driver. In another embodiment, the diagnostic routine 317 is received from the diagnostic device 120 as normal network traffic and incorporated in the device driver 316. The device driver 316 can execute the diagnostic routine 317 by creating an executable file based on the routine and invoking execution of the executable file via a shell command. In another embodiment, the device driver 316 can be configured to execute the diagnostic routine 317 by replacing portions of its own run-time memory algorithms with the diagnostic routine 317 and 'jumping' execution to the new run-time memory location.

Further, based on diagnostic information generated by the diagnostic routine 316, the diagnostic device can remotely request, via the network interface device 304, that the device driver 316 invoke the error correction routine 321. In one embodiment, the error correction routine 321 is a pre-defined routine of the device driver. In another embodiment, the error correction routine 312 is received from the diagnostic device 120 and incorporated in the device driver 316. Accordingly, as illustrated, the network interface device 304 can use a device driver to perform diagnostic and error correction operations. This allows the network interface device 304 to take advantage of the existing communication relationship with the device driver 316 in order to perform these functions. As explained above, the network interface device 304 is configured to receive and process communications from the network 110. Further, the network interface device 304 can be configured to indicate, via a message, flag, command, and the like that particular data being communicated is from the diagnostic device 120 and not from a malicious source. The network interface device has previously authenticated the diagnostic device 120, thereby completing the trusted relationship.

Figure 4:
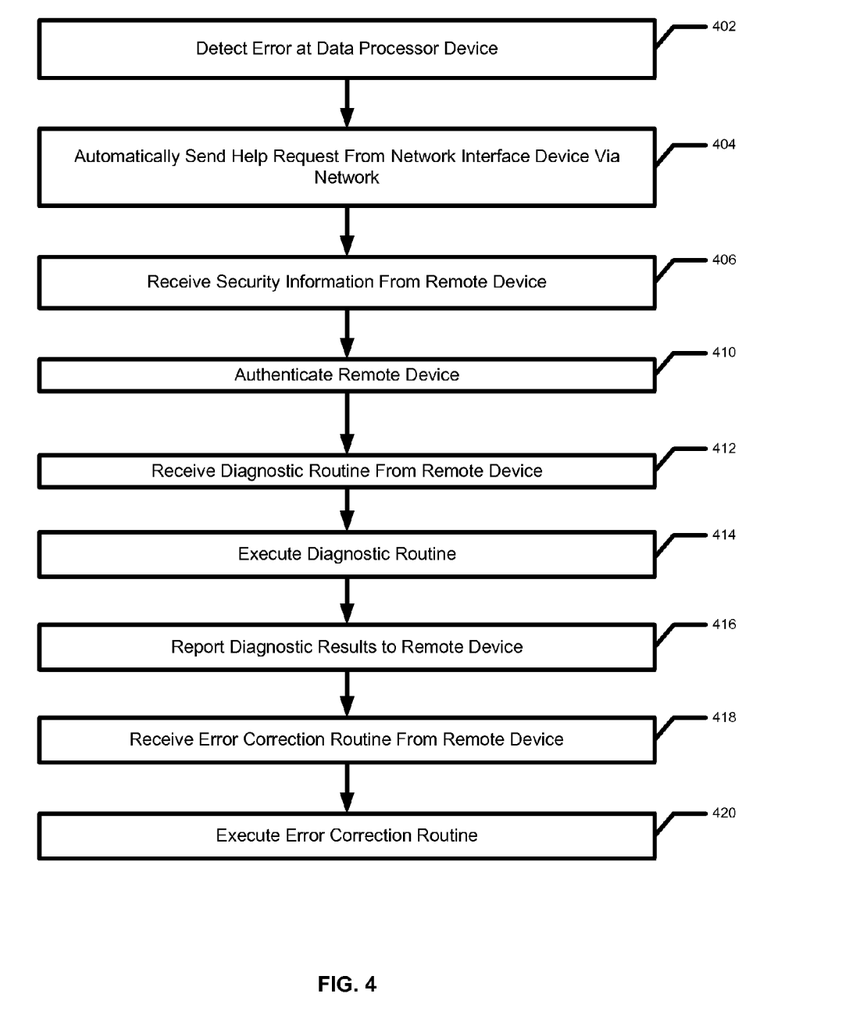
FIG. 4 is a flow diagram of a method of diagnosing and correcting errors at a data processing system in accordance with one embodiment of the present disclosure.

Referring to FIG. 4, a flow diagram of a particular embodiment of a method of diagnosing and correcting errors at a data processing system is illustrated. At block 402, a first data processing device, such as a network interface device, detects an error at a second data processing device, such as a data processor. At block 404, the network interface automatically sends a help request via a network to a remote device. At block 406, the network interface device receives security information from the remote device in response to the help request.

At block 410, the network interface device authenticates the remote device based on the received security information. At block 412, in response to authenticating the security information, the network interface device receives a diagnostic routine from the remote device. At block 414, the network interface device executes the diagnostic routine. At block 416, the network interface device reports diagnostic results from the diagnostic routine to the remote device via the network. At block 418, the network interface device receives an error correction routine from the remote device based on the communicated diagnostic results. At block 420, the network interface device executes the error correction routine to correct the diagnosed error.

Figure 5:
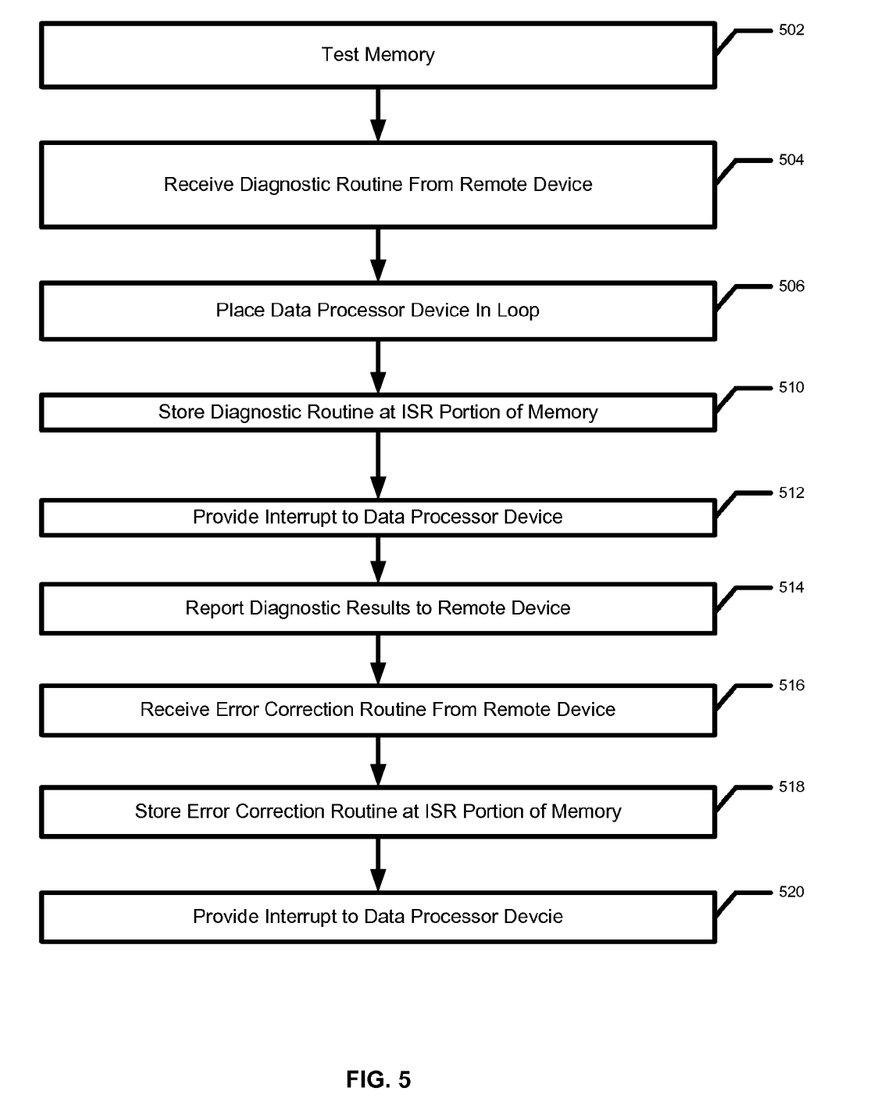
FIG. 5 is a flow diagram of a method of diagnosing and correcting errors at a data processing system in accordance with another embodiment of the present disclosure.

Referring to FIG. 5, a flow diagram of another particular embodiment of a method of diagnosing and correcting a detected error at a data processing system is illustrated. At block 502, a network interface device tests a memory of a data processing system. At block 504, the network interface device receives a diagnostic routine from a remote device. At block 506, the network interface device places a data processor in a loop state, whereby the data processor cannot write to an interrupt service routine (ISR) portion of memory.

At block 510, the network interface device stores the received diagnostic routine at the ISR portion of memory. At block 512, the network interface device communicates an interrupt request to the data processor so that the data processor executes instructions stored at ISR portion (i.e. so that the data processor executes the stored diagnostic routine). At block 514, the network interface device receives diagnostic results from the diagnostic routine and provides the diagnostic results to the remote device. At block 516, based on the communicated diagnostic results, the network interface device receives an error correction routine from the remote device. At block 518, the network interface device stores the error correction routine at the ISR portion of memory. At block 520, the network interface device communicates an interrupt request to the data processor device, so that the data processor executes the error correction routine, thereby correcting the detected error.

Figure 6:
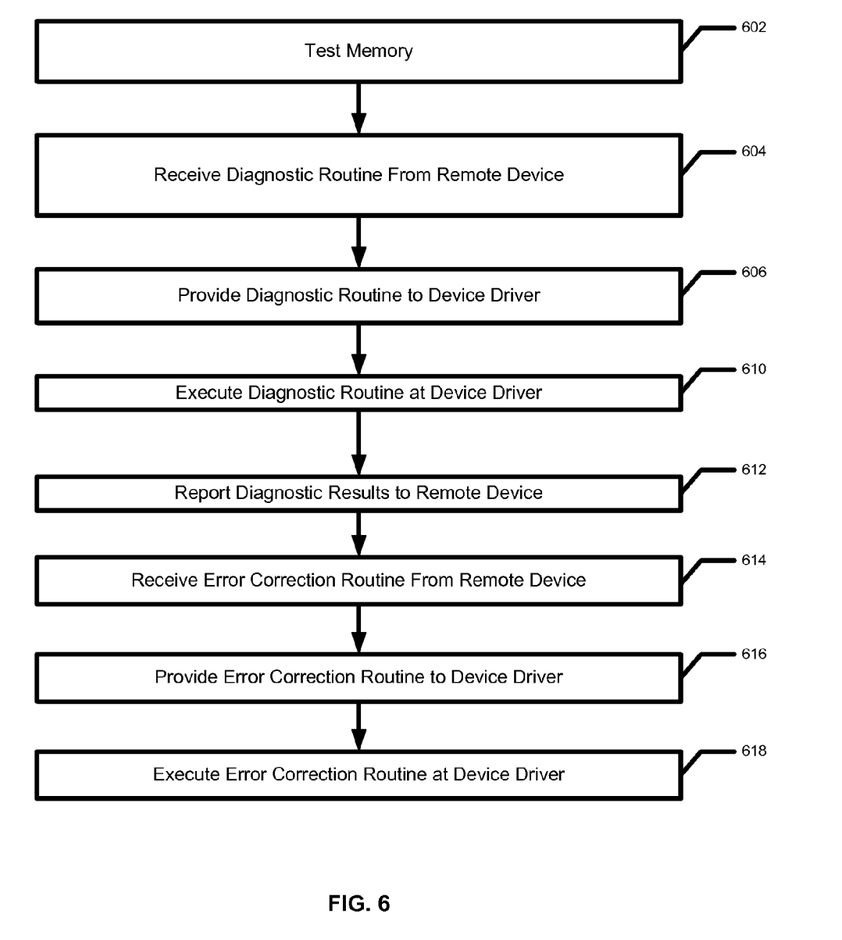
FIG. 6 is a flow diagram of a method of diagnosing and correcting errors at a data processing system in accordance with another embodiment of the present disclosure.

Referring to FIG. 6, a flow diagram of another particular embodiment of a method of diagnosing and correcting a detected error at a data processing system is illustrated. At block 602, a network interface device tests a memory of a data processing system in response to detecting an error at a data processor of the system. At block 604, the network interface device receives a diagnostic routine from a remote device via a network. At block 606, the network interface device provides the received diagnostic routine to a device driver for the network interface device. At block 610, the data processor executes the diagnostic routine at the device driver.

At block 612, the network interface device receives diagnostic results from the diagnostic routine and provides the diagnostic results to the remote device via the network. At block 614, based on the communicated diagnostic results, the network interface device receives an error correction routine from the remote device. At block 616, the network interface device provides the error correction routine to the device driver. At block 618, the data processor executes the error correction routine at the device driver in order to correct the error.

Figure 7:
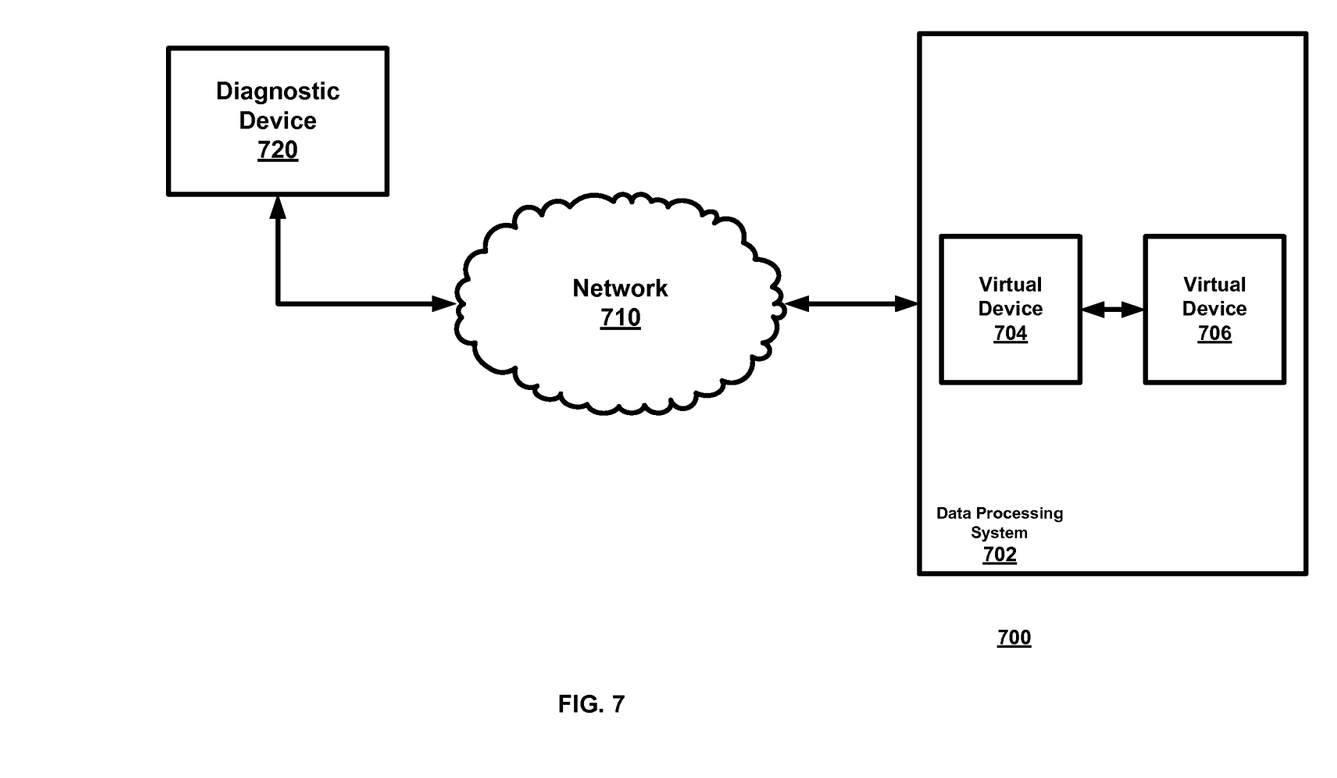
FIG. 7 is a block diagram of a communication system in accordance with another embodiment of the present disclosure.

Referring to FIG. 7, a block diagram of a particular embodiment of a communication system 700 is illustrated. The communication system 700 includes a data processing system 702, a network 710, and a diagnostic device 720. The data processing system 702 and diagnostic device 720 are each connected to the network 710. The network 710 and the diagnostic device 720 are each configured similarly to the corresponding items of FIG. 1.

The data processing system 702 is configured to execute virtual devices, such as virtual devices 704 and 706. For example, the data processing system 702 can include a hypervisor (not shown) or other module configured to provide an interface between the virtual devices and a processor, so that each of the virtual devices 704 and 706 represents a virtual machine. In operation, the virtual devices 704 and 706 can each detect errors at the other and, in response to detecting an error, automatically send a help request to the diagnostic device 720. In response to the help request, the diagnostic device 720 provides diagnostic and error correction routines in similar fashion to that described above. The virtual device that communicated the help request executes the diagnostic and error correction routines, in similar fashion to those described above with respect to the network interface device, in order to diagnose and correct the error at the other virtual device. Thus, the techniques described herein for diagnosing and correcting errors can be applied to virtual as well as physical data processing devices.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
detecting, at a data processing device, an error at a first system of a network, wherein the first system includes the data processing device;
transmitting a help request from the data processing device to a second system of the network in response to detecting the error at the first system;
authenticating at the data processing device, the second system based, at least in part, on authentication information received from the second system after transmitting the help request;
receiving an error correction routine from the second system, based at least in part on authenticating the second system;
executing the error correction routine at the data processing device to resolve the error at the first system; and
disabling, at the data processing device, an operation for authenticating the second system in response to detecting that the error at the first system is resolved.

2. The method of claim 1, further comprising:
enabling, at the data processing device, the operation for authenticating the second system in response to detecting the error at the first system.

3. The method of claim 1, further comprising:
executing a diagnostic routine to determine diagnostic information associated with the first system, in response to authenticating the second system and receiving a diagnostic request from the second system; and
transmitting the diagnostic information associated with the first system to the second system.

4. The method of claim 3, further comprising:
receiving, at the data processing device, the diagnostic routine in the diagnostic request from the second system via the network.

5. The method of claim 1, further comprising:
storing at the memory portion of the first system, a diagnostic routine in response to receiving a diagnostic request from the second system;
receiving an interrupt at the first system; and
executing the diagnostic routine at the first system, to determine diagnostic information associated with the first system in response to receiving the interrupt.

6. The method of claim 5, further comprising:
configuring the first system to operate in a loop state while storing the diagnostic routine at the memory portion of the first system.

7. The method of claim 1, further comprising:
performing a memory diagnostic on a memory portion of the first system to determine whether the memory portion is operational for storage of a diagnostic routine; and
notifying the second system regarding whether the memory portion is operational for storage of the diagnostic routine, in response to said performing the memory diagnostic.

8. The method of claim 7, further comprising:
receiving a diagnostic request at the data processing device from the second system, in response to authenticating the second system and determining that the memory portion is operational for storage of the diagnostic routine.

9. The method of claim 5, wherein said executing the diagnostic routine comprises:
transmitting an execution request from the data processing device to a device driver of the first system, wherein the execution request includes a request for the device driver to execute the diagnostic routine.

10. The method of claim 1, wherein the first system comprises a processor, and wherein the error indicates that the processor is unable to execute a diagnostic routine.

11. The method of claim 1, wherein said detecting the error comprises:
transmitting a message from the data processing device to a processor of the first system; and
detecting the error at the first system based at least in part on determining that a response to the message has not been received within a predefined period of time.

12. The method of claim 1, wherein said detecting the error at the first system comprises:
detecting that a power level associated with a processor of the first system is below a threshold power level, or
receiving an error notification from the processor indicating the error at the processor.

13. The method of claim 1, wherein the data processing device comprises a network interface card of the first system.

14. The method of claim 1, wherein the data processing device is configured to execute a first virtual device, and a processor of the first system is configured to execute a second virtual device.

15. The method of claim 1, wherein the second system comprises a device driver associated with the first system, and wherein the device driver is configured to control the data processing device.

16. The method of claim 15, further comprising:
enabling the operation for authenticating the device driver, in response to detecting the error at the first system.

17. The method of claim 1, further comprising:
transmitting a diagnostic request from the data processing device to a device driver of the first system, wherein the diagnostic request comprises an indication of a diagnostic routine of the device driver; and
executing the diagnostic routine at the device driver to determine diagnostic information associated with the first system, in response to receiving the diagnostic request.

18. The method of claim 17, further comprising:
transmitting an error correction request from the data processing device to the device driver, wherein the error correction request comprises an indication of the error correction routine of the device driver based, at least in part, on the diagnostic information determined by the device driver.

19. The method of claim 18, wherein said executing the error correction routine comprises:
executing the error correction routine at the device driver to resolve the error at the first system, in response to receiving the error correction request.

20. A method, comprising:
detecting, at a data processing device, an error at a first system, wherein the first system includes the data processing device;
storing a diagnostic routine at a memory portion of the first system, in response to detecting the error, the memory portion associated with at least an interrupt service routine of the first system;
providing a first interrupt from the data processing device to a processor of the first system to cause the first system to execute the diagnostic routine for determining diagnostic information associated with the first system;

storing an error correction routine at the memory portion of the first system based, at least in part, on the diagnostic information; and providing a second interrupt from the data processing device to the processor of the first system to cause the first system to execute the error correction routine to resolving the error of the first system.

21. The method of claim 20, further comprising:

executing a memory diagnostic on the memory portion prior to storing the diagnostic routine to determine whether the memory portion is operational for storage of the diagnostic routine.

22. The method of claim 20, further comprising:

configuring the first system to operate in a loop state while storing the diagnostic routine at the memory portion of the first system.

23. The method of claim 20, further comprising:

receiving the diagnostic routine at the data processing device from a remote device, in response to detecting the error.

24. The method of claim 20, wherein the data processing device comprises a network interface device of the first system.

25. A system comprising:

a first processor device;

a network interface comprising a second processor device, the network interface coupled with the first processor device, the network interface configured to:

detect an error at the first processor device;

transmit a help request from the network interface to a remote device via a network in response to detecting the error at the first processor device;

authenticate the remote device based, at least in part, on authentication information received from the remote device after transmitting the help request;

receive an error correction routine from the remote device, based at least in part on authenticating the remote device;

execute the error correction routine to resolve the error at the first processor device; and disable an operation for authenticating the remote device in response to detecting that the error at the first processor device is resolved.

26. The system of claim 25, wherein the network interface is further configured to:

store, at a memory portion of the system, a diagnostic routine received from the remote device; and receive an interrupt, at the first processor device, from the second processor device to cause the first processor device to execute the diagnostic routine to determine diagnostic information associated with the system.

27. The system of claim 25, wherein the network interface is further configured to:

store the error correction routine received from the remote device at a memory portion of the system, wherein the memory portion is associated with at least an interrupt service routine of the system; and receive an interrupt, at the first processor device, from the second processor device to cause the first processor device to execute the error correction routine.

28. A system comprising:

a first processor device; and a network interface comprising a second processor device, the network interface coupled with the first processor device, the network interface configured to:

detect an error at the first processor device;

store a diagnostic routine at a memory portion of the system in response to detecting the error, the memory portion associated with at least an interrupt service routine of the system;

provide a first interrupt from the second processor device to the first processor device, to cause the first processor device to execute the diagnostic routine for determining diagnostic information associated with the system;

store an error correction routine at the memory portion of the system based, at least in part, on the diagnostic information; and provide a second interrupt from the second processor device to the first processor device to cause the first processor device to execute the error correction routine for resolving the error of the first processor device.

29. The system of claim 28, wherein the first processor device is further configured to:

execute the diagnostic routine to determine the diagnostic information of the system, in response to receiving the first interrupt; and execute the error correction routine to resolve the error of the first processor device, in response to receiving the second interrupt.

30. A non-transitory machine-readable storage medium having machine executable instructions stored therein, the machine executable instructions comprising instructions to:

detect, at a data processing device, an error at a first system of a network, wherein the first system includes the data processing device;

transmit a help request from the data processing device to a second system of the network in response to detecting the error at the first system;

authenticate, at the data processing device, the second system based, at least in part, on authentication information received from the second system after transmitting the help request;

receive an error correction routine from the second system based at least in part on authenticating the second system;

execute the error correction routine at the data processing device to resolve the error at the first system; and disable, at the data processing device, an operation for authenticating the second system in response to detecting that the error at the first system is resolved.

31. The non-transitory machine-readable storage medium of claim 30, wherein said instructions further comprise instructions to:

store, at a memory portion of the first system, a diagnostic routine in response to receiving a diagnostic request from the second system;

receive an interrupt at the first system; and execute the diagnostic routine, at the first system, to determine diagnostic information associated with the first system in response to receiving the interrupt.

32. The non-transitory machine-readable storage medium of claim 30, wherein said instructions further comprise instructions to:

store at a memory portion of the first system, the error correction routine received from the second system;

receive an interrupt at the first system; and execute the error correction routine at the first system, in response to receiving the interrupt.

33. A non-transitory machine-readable storage medium having machine executable instructions stored therein, the machine executable instructions comprising instructions to:
- detect, at a data processing device, an error at a system, wherein the system includes the data processing device;
- store a diagnostic routine at a memory portion of the system, in response to detecting the error ,the memory portion associated with at least an interrupt service routine of the system;
- provide a first interrupt from the data processing device to a processor of the system to cause the system to execute the diagnostic routine for determining diagnostic information associated with the system;
- store an error correction routine at the memory portion of the system based, at least in part, on the diagnostic information; and
- provide a second interrupt from the data processing device to the processor of the system to cause the system to execute the error correction routine for resolving the error of the system.

34. The non-transitory machine-readable storage medium of claim 33, wherein said instructions further comprise instructions to:
- perform a memory diagnostic on the memory portion prior to storing the diagnostic routine, to determine whether the memory portion is operational for storage of the diagnostic routine.

* * * * *